Aug. 25, 1931.  G. B. REED  1,820,543
LIGHT PROJECTION APPARATUS
Original Filed Sept. 22, 1926  3 Sheets-Sheet 2
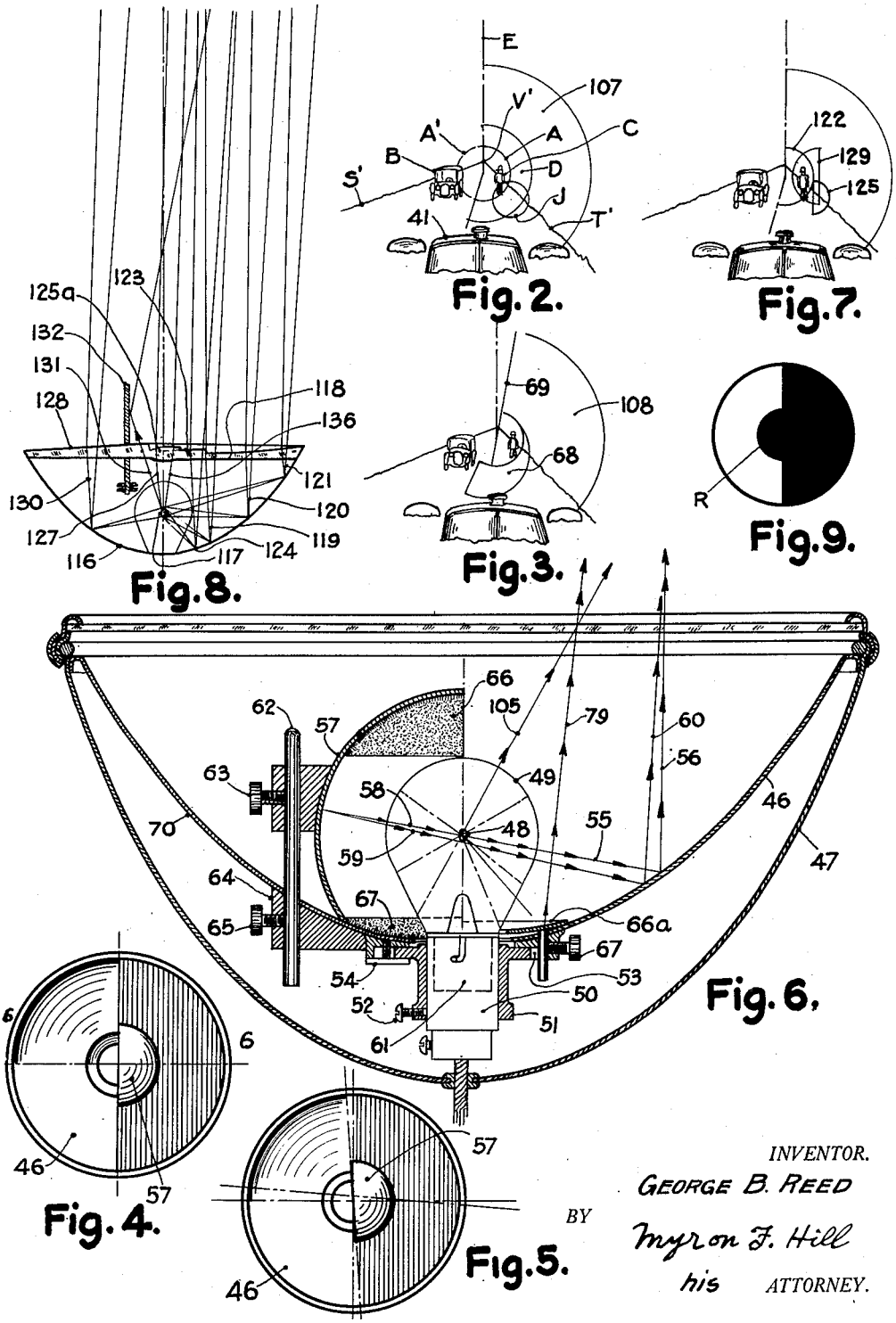
INVENTOR.
GEORGE B. REED
BY
Myron F. Hill
his ATTORNEY.

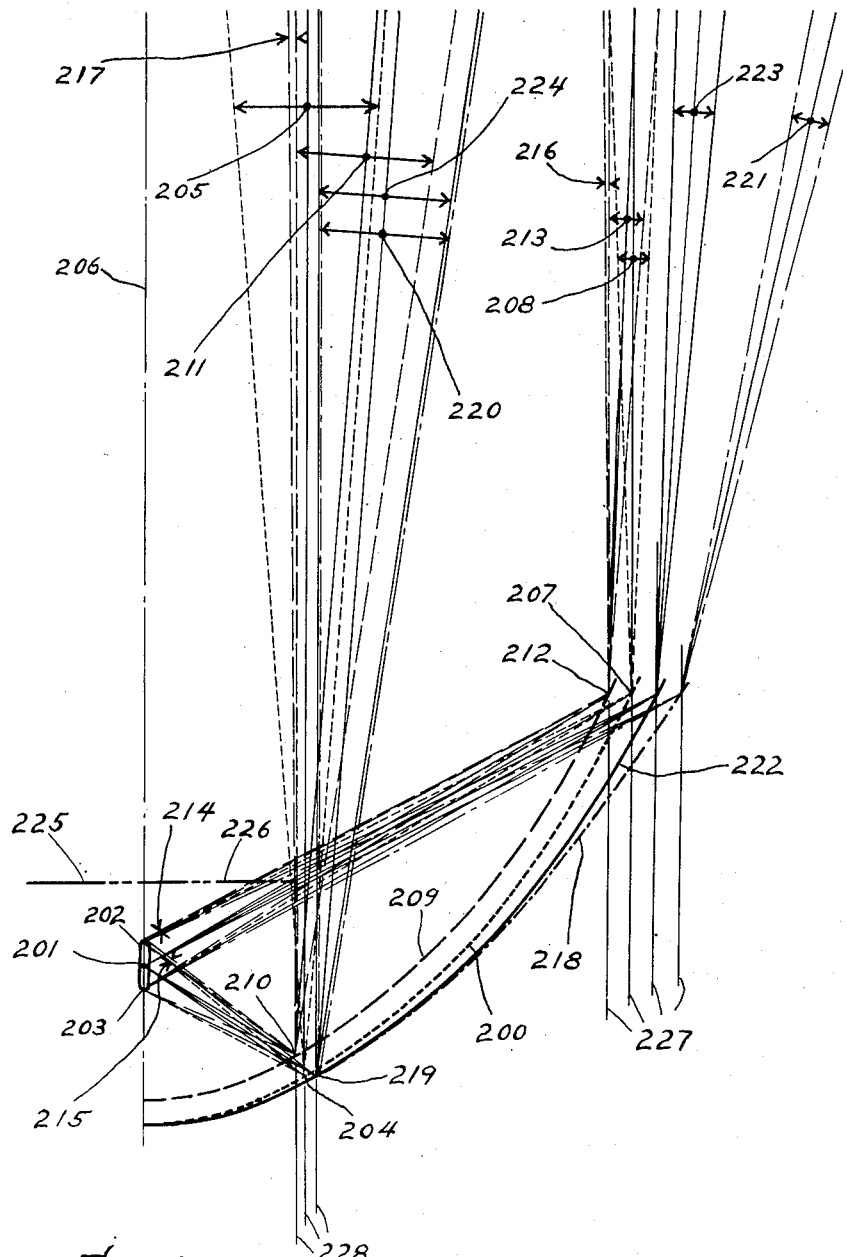

Aug. 25, 1931.  G. B. REED  1,820,543
LIGHT PROJECTION APPARATUS
Original Filed Sept. 22, 1926   3 Sheets-Sheet 3
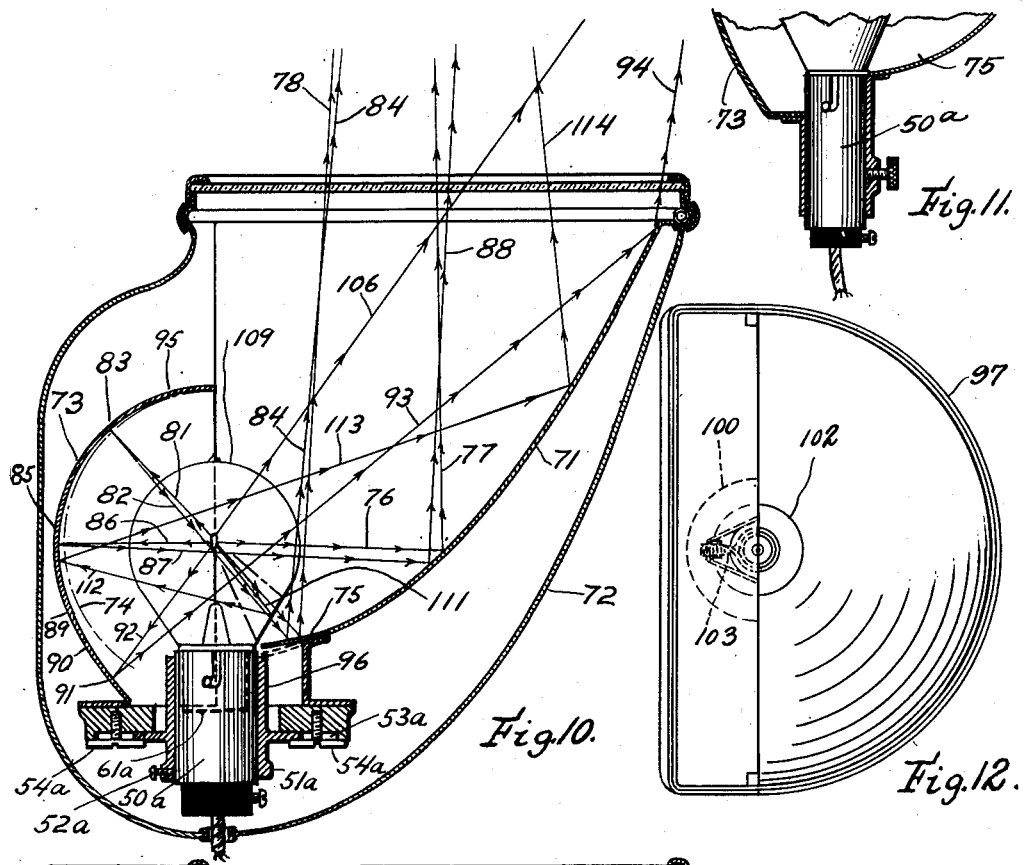
INVENTOR.
GEORGE B. REED
BY Myron F. Hill
his ATTORNEY.

Patented Aug. 25, 1931

1,820,543

UNITED STATES PATENT OFFICE

GEORGE B. REED, OF BROOKLYN, NEW YORK

LIGHT PROJECTION APPARATUS

Application filed September 22, 1926, Serial No. 137,029. Renewed January 27, 1931.

This invention relates to light projection apparatus designed to project a powerful, concentrated beam of light far in advance of an automobile or the like upon which it is mounted. More particularly the invention relates to a headlight adapted to illuminate powerfully the objects above the road surface and the road surface itself upon only that side traversed by the automobile carrying said headlight, while preventing any powerful rays or glare from reaching the eyes of the driver of an approaching car on the opposite side of the road, coming from the opposite direction.

The objects of my invention are twofold, to provide a powerful illumination for the right hand portion of the roadway and the roadside both on the surface of the road and well above the surface of the road, and to prevent any brilliant rays from striking the eyes of an approaching driver during ordinary driving conditions, irrespective of vertical motion of the automobile upon which my invention is mounted.

In the accompanying drawings;—

Figure 1 is a diagrammatic view of my invention and includes its relation to various forms of reflector and rays projected from a common light source.

Fig. 2 shows a roadway viewed from the driver's seat of an automobile and the positioning thereon of the illumination of my invention with the parts thereof positioned as in Fig. 4.

Fig. 3 shows a variation of the illumination of Fig. 2, as projected by a modification of my invention with the parts thereof positioned as in Fig. 5.

Fig. 4 is a front view of one form of lamp embodying my invention.

Fig. 5 is a front view of a variation of the lamp shown in Fig. 4.

Fig. 6 is a view on a horizontal section through the axis of the lamp shown in Fig. 4, on line 6—6.

Fig. 7 is a view of a roadway similar to that of Fig. 2 and the positioning thereon of the illumination projected by another modification of my invention of the form shown in Fig. 8.

Fig. 8 is a diagrammatic horizontal axial section of the lamp structure and resultant rays projecting the illumination shown in Fig. 7.

Fig. 9 is a front view of an area of interruption to produce a partial cut-off of the light rays in cooperation with the reflectors of my invention this being diagrammatically the effect of the parts when positioned as in Fig. 4.

Figure 10 is a central horizontal sectional view of another form of lamp embodying my invention.

Figure 11 is a sectional view of an alternate form of lamp socket to that shown in Figs. 6, 10 and 14.

Figure 12 is a front view of another form of lamp embodying my invention.

Figure 13 is a central horizontal sectional view of the lamp shown in Fig. 12.

Figure 14 is a rear view of the socket used in the lamps shown in Figures 6 and 10.

My invention resides in the method of, and apparatus for, producing an automobile headlight illumination of an entirely novel form. In Fig. 2 is shown a roadway, as seen from an automobile equipped with my invention, S' and T' being the left and right hand edges respectively of the roadway, disappearing in perspective at V', and 41 being the front and top of the engine hood from behind which we are viewing the scene. On this roadway there is shown an approaching automobile or other vehicle on the left, B, and a pedestrian or other object C on the right. By means of suitable light projection apparatus, I throw a spot of considerable concentration and brilliance as bounded by the semicircle A and the dash line semicircle A', the center of this spot being pointed far down the road ahead of the vehicle carrying my invention, and the center of the spot being furthermore substantially in a horizontal plane with the source of light, which latter is positioned upon the car at a reasonable height above the roadway. The left portion A' of this brilliant spot of illumination I however shut off by suitable means, the line of demarcation, which hereinafter I shall speak of as the cut-off plane, being projected upon the scene as a relatively sharply defined line E, and by suitable apparatus I project at least a portion of the light rays intercepted from the semicircular spot A' to the right of the cutoff plane E to supplement the illumination of the semicircular spot A and illuminate the less distant portions of the roadway and roadside, as shown in the annular ring D. I may also produce special light concentration at any desired point such as the road edge as at J, using a portion of the aforementioned intercepted rays for such purpose.

The illumination described is preferably to be used when passing an automobile or automobiles coming from the opposite direction, the common headlamps being then dimmed or extinguished by conveniently arranged switching means. It is readily seen that when steering a reasonably straight course upon a straight road, substantially no glare can strike the eyes of an approaching driver, while on the other hand, the driver of the car equipped with my invention is furnished an illumination not only of the right hand ditch, but also of objects above the roadway, even in the face of considerable glare from approaching cars, and certainly a far better illumination than that provided by the depressed legal illumination now generally used when in the face of such glare. Furthermore, changes of road contour, bumps, changes in spring loading and the like, which seriously affect the legal illumination, can have substantially no effect upon my illumination. The only case in which my illumination can produce a harmful effect is when the axis of the car carrying my illumination falls to the left of the center of the road, as when approaching a right hand curve in the road, in which case glare would strike the eyes of an approaching driver. However, in practice it is found that in approaching such a curve when another car is approaching, it is entirely unnecessary to use my illumination since the glare from the lamps of the other car is less in this case than upon a straight road, and the legal illumination is found sufficient for the driver of the car equipped with my invention.

The light source at present in use in electric automobile headlights and spotlights is usually the filament of an electric bulb, this filament having finite dimensions, and it is readily seen that this finite dimension of the filament introduces a considerable complication or modification of the geometry of the light rays reflected from the more common forms of reflecting surface now in use, the commonly understood geometry of which is predicated upon a point source of light positioned exactly at the focus of the reflecting surface.

In Fig. 1 is shown in exaggerated size a filament 202—203 of a common automobile headlamp bulb, the light from which it is desired to use with economy and precision for the projection of a brilliant illumination, such as that of the semi-circular spot A of Fig. 2, as hereinbefore described, this spot to be sharply bounded at the left edge, no matter how far projected. The filament, if of the present conventional V form, may be considered as having length, breadth and thickness, the length being measured as that of a line bisecting the V from the apex to an imaginary line connecting the open ends of the legs, the breadth being measured across the open ends of the V, and the thickness being that of the minute coiled diameter of the wire.

I prefer to so position the bulb in my lamp that the centers of both legs of the filament V lie wholly in the desired cut-off plane E of Fig. 2, shown in section as the line 206, Fig. 1, the cut-off plane being normal to the plane of the drawing. The filament, as thus viewed, has only thickness, i. e., of the coil, and length 202—203. It will be readily understood that the minute dimension of thickness of the filament can have little adverse effect upon the sharpness of the cut-off, where the light rays from the filament strike a reflector at the intersection of the cut-off plane with said reflector, no matter what the curve of revolution of the reflector about the axis 206 may be; and at points on a reflector to the right of the cut-off, the thickness is not the governing dimension. The length dimension 202—203, however, has a serious effect upon the attainment of a cut-off with respect to the curvature of a reflector, and by similar reasoning to the above it may be shown that this effect is greatest in a horizontal plane, such as that shown in Fig. 1, when projecting an illumination as shown in Fig. 2. An element of one-half of a paraboloidal reflector 200 is shown in short dash lines, whose focus is at the center of length 201 of the filament, as in the common focal positioning of automobile headlamps, spotlights and the like. Rays from the filament to points on the reflector 200 such as 204 and 207, will then be projected as bundles of diverging rays 205 and 208, whose centers are parallel with the axis 206 as shown by the guide lines 227 and 228. The sum of all such bundles from a circular paraboloidal reflector so positioned with respect to the filament, will be a substantially circular field of light. If an attempt be made, however, to cut off a portion of this circle, such as the semi-circle A', Fig. 2, by a similar area of interruption in or very close to the lamp, no cut-off could be obtained except at an extremely short distance from the lamp, the entire circular field being considerably darkened, but still supplied by the rays to the left of the parallel axes of the bundles 205 and 208, which cross the desired cut-off plane at too short a distance in front of the lamp.

It has been proposed, for purposes, however, other than that of my invention, as set forth in a patent to Ames, Jr., to retract the filament in a paraboloidal reflector, so that the front tip only of the filament is at the focus, this arrangement being shown in Fig. 1 as the paraboloidal element 209 in long dash lines of the same focal length as the element 200, the rays from the front tip of the filament to any points on the reflector such as 210 and 212 then being projected parallel with the axis and the rest of the bundles being projected outwardly therefrom. If an area of interruption, such as a semicircular shield be imposed upon a complete circular paraboloidal reflector so focused, the field will evidently be similarly interrupted. However, in retracting the filament it is seen that the axis of a bundle 211 projected from a point near the center of the reflector is thrown outwardly much more than the axis of a bundle 213 from an outer point. The result is that the distribution of light is inconsistent, and undesirable concentrations and deficiencies or dark areas appear in the field at distances at which the light is to be effective. Furthermore, there is a further angle 214 and 215 caused by the appreciable thickness of the filament, which will be reflected as 216 and 217 slightly to the left of parallel with the axis of the lamp, which is quite effective in blinding an approaching driver. For this reason the filament in this arrangement must be still further retracted to preserve the cut-off intact, and this increases the difficulty noted, the result being either an imperfect cut-off line or a darkening of the field at the center adjacent the cut-off, at the most useful road distances.

The common coordinate formula for a parabola is $y^2=2px$, the distance from the focus 201, Fig. 1, to the vertex being $$\frac{p}{2}.$$

For direct comparison with this parabola, an hyperbola, one vertex of which is located at the origin of coordinates, may be expressed by the formula $y^2=2px+ax^2$. Using the same value of $p$ and the same focal positioning $$\frac{p}{2}$$

as the foregoing parabola 200 with filament centre in focus, the hyperbola 218 shown in dash and dot lines is seen to deviate outwardly from the parabola by the value only of $ax^2$. In the prior art it has been found that the immediate axial portion of any non-compound reflector of revolution of practicably short focus designed to project a concentrated beam from a finite light source, cannot be used in conjunction with a sharp cut-off due to the too great proximity and consequently magnified inaccuracy of the filament, of which the angle 215, Fig. 1, is one example. The area of interruption, as 225, must therefore be prolonged as 226 somewhat to the open side of the lamp, Fig. 9 showing a front view of such an area of interruption in which the central open-side projection R corresponds to 226 in Fig. 1. The hyperbola just considered, in order to project from the point 219 a ray-bundle 220 which will pass an area of interruption 226 of reasonably small size, and no portion of which will ever cross the cut-off 206, will require a value of "$a$" which will produce a curvature of the same instantaneous incidence of the ray-bundle from the filament at the point 219 as the retracted filament parabola 209 at a similar point 210. While I do not wish to limit my invention against the use of hyperboloidal reflectors to approximate my desired lighting result, I have found such a value of "$a$" to produce rather too great spreading of the hyperboloidal reflector, due to the squaring of the abscissa measurement in the expression $ax^2$ of the comparative hyperbolic formula, this producing as the ray bundle 221 undesirable spreading and weakening of the desired spot field. By assigning a smaller exponent than 2 to $x$ in the expression $ax^2$, and a higher value to "$a$", the bundle 220 near the center of the reflector may be kept the same and the bundle 221 brought inward. With the next lower unit exponent for $x$, however, the formula becomes $y^2=2px+ax$, which is seen to be merely a parabola.

From the above I have deduced that the preferred curve of revolution in my invention is expressed by the formula $y^2=2px+ax^b$ where $b$ is greater than 1 and less than 2. It is possible that in commercial reflectors, inaccuracies of manufacture may depart from parabolas or hyperbolas slightly without intention or knowledge of the makers. Such departures, of course, do not lie in the field of my invention.

In Fig. 1, 222 is an element of such a reflector shown in solid lines, which, by the assignment of suitable values to $x$ and $b$, and with the same focal positioning $$\frac{p}{2}$$

as the parabola 200 will project a ray-bundle 224 clearing a reasonably small central area of interruption 226, and a ray-bundle 223 from the outer rim not too widely divergent, no road lighting rays from any portion of the uninterrupted side of this reflector ever crossing the cut-off plane 206 no matter how far effectively projected, and all rays obeying the consistent distribution of my formula in contra-distinction to the arbitrary filament misplacement in the parabolæ of the earlier art.

In the above description and in the view of Fig. 1 I have respectively described and illustrated only the dimensions of length and thickness of the filament, according to the nomenclature thereof which I have specified. It will be readily seen that the dimension of filament breadth, as measured across the legs of the V, can have no appreciable effect upon the action of the ray-bundles with respect to cut-off insofar as the section of Fig. 1 is concerned. In axial sections other than that of Fig. 1, the said breadth of filament becomes of smaller aspect, finally merging at the cut-off plane into the filament thickness dimension which I have already discussed. If the filament be of form other than that of a V, the positioning thereof may be accordingly arranged to present the best aspect with regard to the cut-off. Furthermore, if it is desired to project a cut-off which is not a single plane, a sector being projected, for instance, less or greater than the semi-circular spot A, of Fig. 2, the filament may be positioned to conform to the more important portion of the cut-off.

I do not wish to limit my invention to the specific reflecting details hereinbefore described, since certain variations are possible without departing from the essence of my invention. Slight reflector curve variations or inaccuracies compensated by adjustments of filament positioning and variations of other lamp elements in their interrelations to project substantially the same light effects for road illumination, are possible, as set forth in my specification, and such means to establish the light projection I have described, lie within its scope.

In actual practice I have constructed satisfactory reflectors in which the values $p=2.5$, $x=.25$ and $b=1.5$ also $1.25$ were used in my formula; though my invention is not limited to these specific values.

In the foregoing specification I have considered, described, and illustrated diagrammatically means for the projection of the central illumination of my invention. In Fig. 6 is shown a section similar to those of Fig. 1 through a lamp embodying the hereinbefore described means of central illumination, together with specific means of interruption and of producing my desired auxiliary illumination. Within the casing 47 is firmly mounted the main reflector 46 which may be of any form suitable for the projection of my desired central illumination as hereinbefore described. The light source or filament 48 of the electric light bulb 49 is positioned with respect to the reflector 46 to produce the desired spot AA' Fig. 2, capable of sharp cutoff. The base 61 of the bulb is held in any form of socket as 50 which latter is adjustable axially and rotatively within the carrier 51, said adjustment being locked by a set screw 52. The carrier 51 is adjustable radially with respect to the axis of the lamp in the annulus 53, being locked in place by screws one of which 54 is shown in this view. One of the rays from the filament 48 is shown as 55, which is reflected as the ray 56 slightly divergent radially from parallel as hereinbefore described. The secondary reflector 57 is of spherical curvature, positioned with its center on the axis of the lamp or light source, but slightly to the rear of the center of the light source, so that a ray to it 58 from the light source will be reflected as 59 slightly to the rear of the center of the light source, this ray being in turn reflected from the main reflector as 60 somewhat more divergent radially than the ray 56. The field of illumination projected by all such rays from the secondary reflector as described will be the annular illumination D in Fig. 2, supplementing the brilliant central semicircle A with a diminished illumination falling on the less distant portions of the roadway and roadside. The secondary reflector 57 is mounted adjustably upon the rod 62 to which it may be locked by the screw 63, the rod 62 being in turn held by the screw 65 in a block 64 fastened by any means such as solder to the main reflector 46. In this embodiment of my invention the more forward portion 66 of the spherical secondary reflector 57 cannot be utilized, since too greatly affected by the thickness and lateral misplacement of the filament. Similarly the portion 67 of the main reflector falling behind the secondary reflector would produce objectionable rays if allowed to reflect. These two reflecting surfaces 66 and 67 are therefore shut off by means of black velveteen pasted thereon.

It will be readily seen that the secondary reflector 57 serves three general purposes, namely, to project the secondary field of illumination D of Fig. 2, to cut off the direct rays of the filament from the view of the driver of an approaching vehicle, and to cut off the left portion A' of the main spot of Fig. 2. The necessary central extension of the area of interruption shown in Fig. 9 as hereinbefore noted, is provided in this embodiment of my invention of Fig. 6 by the tertiary reflector 66a which covers the main reflector as shown, and is held in position by the screw 67a. This tertiary reflector may be of one of various forms suitable to reflect light rays from the filament to some portion of the field of illumination well to the right of the cutoff E of Fig. 2, the reflector 66a shown being substantially paraboloidal in character, positioned so that the filament is to the rear of the correct focus of said reflector, this resulting in a spread of the rays therefrom reflected, to join the illumination in the secondary area D of Fig. 2.

Fig. 4 is a front view of the embodiment of my invention described in the foregoing paragraph, the axis of the secondary spherical reflector 57 coinciding with the axis of the main reflector 46 and the light source. By swinging the secondary reflector 57 downwardly upon its supporting rod 62 to the position shown in Fig. 5, a secondary illumination of the form of 68 in Fig. 3 is projected, while the cutoff line 69 is at the same time tilted somewhat clockwise as shown. Another modification that may be introduced resides in the tertiary reflector 66a being of substantially paraboloidal curvature of such focal dimension that it is substantially in focus with the filament, yet with its axis so pointed as to throw its concentrated beam as J, Fig. 2 on the edge of the roadway or ditch, it being especially desirable to brilliantly illuminate this point when facing the glare of approaching headlights.

It is to be understood that the lamp shown in Fig. 6 is largely of the nature of a demonstrating apparatus, the various reflectors and light source being entirely demountable and widely adjustable, in order to demonstrate the effect and control of the different arrangements and combinations of the parts shown or of other experimental parts. The radial adjustment of the carrier 51 was provided because of the great inaccuracy of the filament positioning in the existing electric light bulbs with reference to the bayonet pins, contact points and the like, upon which the positioning of the filaments with respect to the reflectors depends. It is to be further noted that the left portion 70 of the main reflector is of no value as a light projection apparatus being retained in this embodiment of my invention solely as a convenient means of supporting the necessary portions of the projection apparatus in a common form of casing as 47.

In the embodiment of my invention illustrated in Fig. 10, which is a section similar to those before considered and illustrated, only the useful portion 71 of the main reflector is constructed, and the casing 72 is modified to enclose only the useful parts. The main reflector 71 is of any suitable curvature, such as my preferred reflectors hereinbefore described, having, however, the tertiary reflecting surface 75 formed thereon to produce the desired interruption and project light rays to desired portions of the field as described in relation to Figs. 2 and 6. The light rays producing the central field A of Fig. 2 are here shown as 76 and 77. The tertiary rays corresponding to the tertiary ray 79 in Fig. 6 is shown as 78 in Fig. 10.

The most important feature of the lamp illustrated in Fig. 10 is the use of a preferred type of secondary reflector 73 produced by the revolution about an axis substantially coincident with the axis of the main reflector and the filament of a spiral of the first, second or higher order, generated from a base circle 74 whose center is at the substantial center of the filament. The curvature of this reflector will produce the following effects;—

From points in the general region 83 a ray such as 81 is reflected as ray 82 rearwardly of the filament and again reflected as the ray 84 to augment the tertiary illumination 78. A ray 86 to the general region 85 is reflected as the ray 87 to the main reflector whereby it is again reflected as the ray 88 to produce the secondary reflection D of Fig. 2. Such rays reflected from successive points of the reflector 73 such as 89, 90 and 91 will, by reason of the spiral nature of the generating curve, pass successively more rearwardly of the focus or substantial center of the filament, so that all such rays up to the last available ray as 92, 93, 94 may be again reflected from the main reflector to successively nearer portions of the roadway and roadside. Such a reflector of proper formula and positioning will therefore reutilize as measurably concentrated illumination a large portion of the illumination cut off from the left portion A' of the main spot in Fig. 2. Rays from the extreme forward portion 95 of the reflector 73 will be reflected back into the socket only of the bulb. This portion 95 may be therefore shut off as by a non-reflecting surface or material, or other means may be used to utilize the rays falling toward that section in useful work.

In the lamp shown in Fig. 10 a radially adjustable carrier for the socket may be used similarly to the lamp of Fig. 6, a rear view of said adjustable carrier and socket being shown in Fig. 14. The base 61a of the bulb is held in any form of socket 50a which latter is adjustably axially and rotatively within the carrier 51a, said adjustment being locked by a set screw 52a. The carrier 51a is adjustable radially with respect to the axis of the lamp in the annulus 53a, being locked in place by screws 54a. If bulbs of suitable accuracy in the axial positioning of the filaments can be obtained, there may be provided instead of this radially adjustable carrier a more common form of socket as shown in Fig. 11, adjustable only as to focus along the axis and rotatably.

Another embodiment of my invention is illustrated in Fig. 13. In this lamp the casing 97 and main reflector 98 may be substantially similar to those shown in Fig. 10. The tertiary surface 99 is of curvature similar to that of the surface 75 in Fig. 10, except that it may be continued aproximately to the center of the lamp, the extreme central portion being of such character as to reflect rays from the filament back either far to the right of the axis or far radially divergent therefrom. The secondary reflector 100 is of similar form to the reflector 73 of Fig.

10, except that it is extended almost to the center of the lamp to join the main and tertiary reflectors, to which it may be attached as by rivets 101 or with which it may be formed integrally. The socket 102 is positioned forwardly of the filament so that the useless angle subtended by the socket corresponds with the forward portion 95 of the secondary reflector of Fig. 10, which portion is of little value in any case, while at the same time utilizing an even greater proportion of the effective illumination from the filament as measurably concentrated reflected illumination than in the case of the apparatus of Fig. 10. A further object of this embodiment of my invention is the utilization of a socket 102 held by an arm 103 which is in turn removably held as by a clip 104. This construction permits not only of ready removal of the socket for the replacement of the bulb, but also permits of either accurate location of the bulb by suitable formation of the arm 103 when the lamp is built, if bulbs of sufficient accuracy are used, or else of the adjustment of less accurate bulbs in any direction by the bending of said arm. Fig. 12 is a front view of the lamp shown in Fig. 13.

In the description of the foregoing lamps illustrated in Figs. 6, 10 and 13, I have described the course and effect of only those rays which fall from the light source to one or more of the reflecting surfaces of the lamp. The direct forwardly projected rays from the filament, such as the ray 105 in Fig. 6 and the ray 106 in Fig. 10 will fall to the right side only of the cutoff plane, producing a non-concentrated illumination of the foreground as shown by the area 107 in Fig. 2 and the area 108 in Fig. 3.

There remains visible to a driver of an approaching car B, Fig. 2 to the left of the cutoff plane only a slight radiance from any of the lamps of my invention as hereinbefore described, when functioning properly. This glow serves largely as a marker of the car carrying such lamps, equivalent to the illumination of heavily dimmed headlights of ordinary character, or small auxiliary side lights, and is not in the least blinding to the approaching driver. This residual illumination appearing to the left of the cutoff plane arises from a number of minor causes, such as small inaccuracies in reflector finish or curvature, refraction through the glass of the bulb, and especially from the internal reflections from the glass of the bulb as shown by the arrows 111, 112, 113, 114 of Fig. 10.

In the embodiments of my invention hereinbefore described, the reflecting means or apparatus is protected by common window glass or the like in front, this glass producing substantially no deflection or modification of the rays projected through it. In Fig. 8 I illustrate another embodiment of my invention in which use is made of certain lenses or lens surfaces in addition to reflecting means, for the projection of an illumination possessing qualities in respect to cutoff similar to the lamps already described. In this embodiment of my invention the reflector 116 may be of substantially paraboloidal character, the light source 117 being positioned with its center substantially at the focus of the reflector. A paraboloidal condition would then exist, as shown in 205 and 208 of Fig. 1, which if not modified would project an illumination impossible of cutoff as desired in my invention. The lens 118, however, positioned forwardly of the right half of the paraboloidal reflector, is of such character as to produce the desired modification of the reflected rays. This may be accomplished, for instance, by a lens of plano-concave form, the forward concave surface of which is produced by the revolution about the axis of the lamp of an arc of a circle whose center lies on the opposite side of the axis of the lamp from the arc that is being revolved. Such a lens of suitable curvature may be made to refract the substantially parallel reflected beams such as 119, 120 and 121 successively radially outward so as to produce substantially the desired illumination of my preferred reflector of Fig. 1, such as the semi-circular spot 122 of Fig. 7. In this embodiment of my invention shown in Fig. 8 the interruption near the axis of the lamp, such as the tertiary reflector 66a of Fig. 6, may be produced by the use of another lens curvature 123 which may be substantially of prismatic character, having its base toward the right, thus refracting the small spot projected by the portion 124 of the main reflector to the portion 125 of the roadway in Fig. 7, well to the right of the cutoff plane. The rays such as 126 and 127 falling forwardly of the lamp, may be collected and concentrated by another lens curvature such as the double convex lens 125a, which is substantially in focus with the filament, but having its axis directed somewhat toward the right, to join the other portions of the illumination as in the form 125 to the right of the cutoff plane. The portion 128 of the lens positioned forwardly of the left half of the paraboloidal reflector, may be prismatic in character, having its base toward the right, thus refracting the rays 130 reflected from that portion of the paraboloidal reflector toward the right, to further augment the general illumination as at 129. Rays such as 131 falling forwardly from the filament toward the left, may be intercepted from the vision of the driver of an approaching vehicle by a shield or reflector such as 132, mounted upon the main reflector 116.

It is to be understood that the combination of lens surfaces and reflector illustrated in Fig. 8 is only one of many which may be utilized to produce a desired illumination according to the purpose of my invention. For instance instead of the lens portion 128 and the shield 132 in Fig. 8 a secondary reflector such as 57 Fig. 6, or 73, Fig. 10 may be used.

In the foregoing specification it is to be distinctly understood that I do not limit the form of my desired illumination to exactly the shape, distribution or direction of pointing shown in the illustrations or described. The cutoff sector A' of the original circular field AA' of Fig. 2, for instance, may include either more or less than 180° and may be bounded by a line no part of which is exactly vertical in any part thereof, or any other modifications from the exact form or forms shown may be adopted without departing from the spirit of my invention with respect to the ability to project a powerful beam of light far in advance of the car, both upon the road surface and well above the road surface, yet of such character that considerable vertical car movement will not cause it to shine in the eyes of an approaching driver. It is to be further understood that the terms "right" and "left" apply only in the sense that the rule of the road is to the right, and would be reversed in sense if such rule were reversed.

What I claim is:—

1. In a motor transport vehicle, a headlamp having a source of light of substantial area and a primary reflector on the right hand side of said source of light, said reflector being in character, substantially between paraboloidal and hyperboloidal, and a shield on the left hand side of said source of light, said reflector and said shield combining to throw a beam upon the right hand side only of a defined line and away from the driver of a vehicle approaching on the left.

2. In a motor transport vehicle, a headlamp having a source of light of substantial area and a primary reflector on the right hand side of said source of light, said reflector being in character substantially between paraboloidal and hyperboloidal, and a shield on the left hand side of said source of light, said reflector and said shield combining to throw a beam upon the right hand side only of a defined line and away from the driver of a vehicle approaching on the left, and a secondary reflecting surface on the shielded side of said source of light, said secondary reflecting surface cooperating with said primary reflector to direct light from the shielded side of said source of light limited to the right hand side of said defined line.

3. In a motor transport vehicle, a headlamp having a source of light of substantial area, and a primary reflector on the right hand side of said source of light, said reflector being in character substantially between paraboloidal and hyperboloidal, and a shield on the left hand side of said source of light, said reflector and said shield combining to throw a beam upon the right hand side only of a defined line and away from the driver of a vehicle approaching on the left, and a secondary reflecting surface on the shielded side of said source of light, said secondary reflecting surface being substantially of the form of a spiral and cooperating with said primary reflector to direct rays from the shielded side of said source of light confined to the right side of said defined line and of progressively diminished illumination from the axis of said lamp outward.

4. In a light projector, a light source, cut-off means on one side of the axis of said light source to prevent issue of rays out of that side of said projector, and a reflector on the other or open side of the axis of the light source, the effective portion of which reflector is generated by the revolution of a curve satisfying the co-ordinate formula $y^2 = 2px + ax^b$ where $b$ is greater than 1, and less than 2, whereby to define a beam from the axis outward on the open side of said light projector.

5. In a light projector, a light source, cut-off means on one side of the axis of said light source to prevent issue of rays out of that side of said projector, and a reflector on the other or open side of the axis of said light source, the effective portion of which reflector is generated by the revolution of a curve satisfying the coordinate formula $y^2 = 2px + ax^b$ where $b$ is greater than 1 and less than 2, whereby to define a beam from the axis outward on the open side of said light projector, said cut-off means on one side associated with a secondary reflecting surface to reflect cut-off light as a beam, augmenting outwardly from said cut-off plane said defined beam on said open side.

6. In a light projector, a light source, cut-off means on one side of the axis of said light source to prevent issue of rays out of that side of said projector, and a reflector on the other side of the axis of said light source, the effective portion of which reflector is generated by the revolution of a curve satisfying the co-ordinate formula $y^2 = 2px + ax^b$ where $b$ is greater than 1 and less than 2, whereby to define a beam from the axis outward on the open side of said light projector, said cut-off means on one side associated with a secondary reflecting surface generated substantially by the revolution of a spiral, whereby to direct the cut-off light as a beam to progressively augment from the axis outward said defined beam on said open side.

In testimony whereof I affix my signature.

GEORGE B. REED.